US008793483B2

(12) United States Patent
Hesses et al.

(10) Patent No.: US 8,793,483 B2
(45) Date of Patent: Jul. 29, 2014

(54) COMPUTER-BASED, AUTOMATED WORKFLOW SYSTEM FOR SENDING SECURE REPORTS

(75) Inventors: Nils Hesses, Hong Kong (HK); Roland Szabo, Budapest (HU)

(73) Assignee: Morgan Stanley, New York, NY (US)

( * ) Notice: Subject to any disclaimer, the term of this patent is extended or adjusted under 35 U.S.C. 154(b) by 224 days.

(21) Appl. No.: 13/150,975

(22) Filed: Jun. 1, 2011

(65) Prior Publication Data

US 2011/0296166 A1    Dec. 1, 2011

Related U.S. Application Data

(60) Provisional application No. 61/350,284, filed on Jun. 1, 2010.

(51) Int. Cl.
 *H04L 29/06* (2006.01)
 *H04L 9/30* (2006.01)
 *H04L 12/58* (2006.01)

(52) U.S. Cl.
 CPC ............ *H04L 63/0428* (2013.01); *H04L 12/58* (2013.01); *H04L 9/3073* (2013.01); *H04L 12/584* (2013.01); *H04L 9/30* (2013.01); *H04L 51/14* (2013.01); *H04L 63/14* (2013.01); *H04L 51/08* (2013.01); *H04L 63/04* (2013.01)
 USPC ........... 713/150; 713/162; 713/168; 713/169; 713/170; 726/26; 726/28

(58) Field of Classification Search
 CPC ......... H04L 9/30; H04L 9/3073; H04L 12/58; H04L 12/584; H04L 63/04; H04L 63/0428; H04L 51/08; H04L 51/14
 USPC ............... 713/150, 162, 168–170; 726/26–30
 See application file for complete search history.

(56) References Cited

U.S. PATENT DOCUMENTS

| 7,096,276 | B2 | 8/2006 | Bodin et al. |
| 7,499,976 | B2 | 3/2009 | Cato |
| 7,552,185 | B1 | 6/2009 | Kirzner et al. |
| 7,689,606 | B2 | 3/2010 | Burgoyne et al. |
| 7,822,671 | B1 * | 10/2010 | Oros ........................... 705/36 R |
| 7,844,813 | B2 * | 11/2010 | Henson et al. ................. 713/150 |
| 2003/0208497 | A1 * | 11/2003 | Witter et al. .................. 707/100 |
| 2005/0114241 | A1 * | 5/2005 | Hirsch et al. .................... 705/35 |
| 2006/0034494 | A1 * | 2/2006 | Holloran ....................... 382/116 |
| 2006/0212377 | A1 * | 9/2006 | Smith et al. ..................... 705/35 |
| 2007/0050276 | A1 * | 3/2007 | Mannion ........................ 705/35 |
| 2007/0106904 | A1 | 5/2007 | Christoff et al. |
| 2007/0130462 | A1 * | 6/2007 | Law et al. ..................... 713/168 |
| 2007/0226300 | A1 | 9/2007 | Smith et al. |
| 2007/0250508 | A1 | 10/2007 | Oxenstierna et al. |
| 2007/0260692 | A1 | 11/2007 | Burgoyne et al. |

(Continued)

*Primary Examiner* — Jeffrey Pwu
*Assistant Examiner* — Jayesh Jhaveri
(74) *Attorney, Agent, or Firm* — K&L Gates LLP

(57) ABSTRACT

Computer-based systems and method for automating the workflow for generating and sending e-mails with attached reports to external recipients in order to reduce security breaches in certain business reporting processes. The system may utilize a first computer system that may import data eligible for attachment to be sent with the e-mail based on user-entered search criteria. The attachments may be strongly encrypted using an encryption program on the user's computer. In some embodiments, a password for decrypting the attachment may be unique to combination of third party (e.g., trading name) and the role of the external recipient with respect to the attachment.

13 Claims, 8 Drawing Sheets

(56) References Cited

U.S. PATENT DOCUMENTS

| | | | |
|---|---|---|---|
| 2008/0091774 A1* | 4/2008 | Taylor et al. | 709/203 |
| 2009/0006851 A1* | 1/2009 | Freeman et al. | 713/170 |
| 2009/0049140 A1 | 2/2009 | Stoddard et al. | |
| 2010/0017593 A1* | 1/2010 | Putz | 713/150 |
| 2010/0145873 A1* | 6/2010 | Bakaya et al. | 705/36 R |
| 2010/0278336 A1* | 11/2010 | Tahan et al. | 380/46 |
| 2010/0318812 A1* | 12/2010 | Auradkar et al. | 713/193 |

* cited by examiner

| Select contact for johndoe | | | | |
|---|---|---|---|---|
| First name | Last name | Business unit | Login id | Email address |
| John | Doe | ISG Operations | johndoe | john.doe@bank.com |

Ok — 174    Cancel

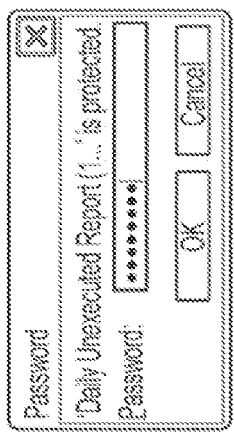
FIG. 9
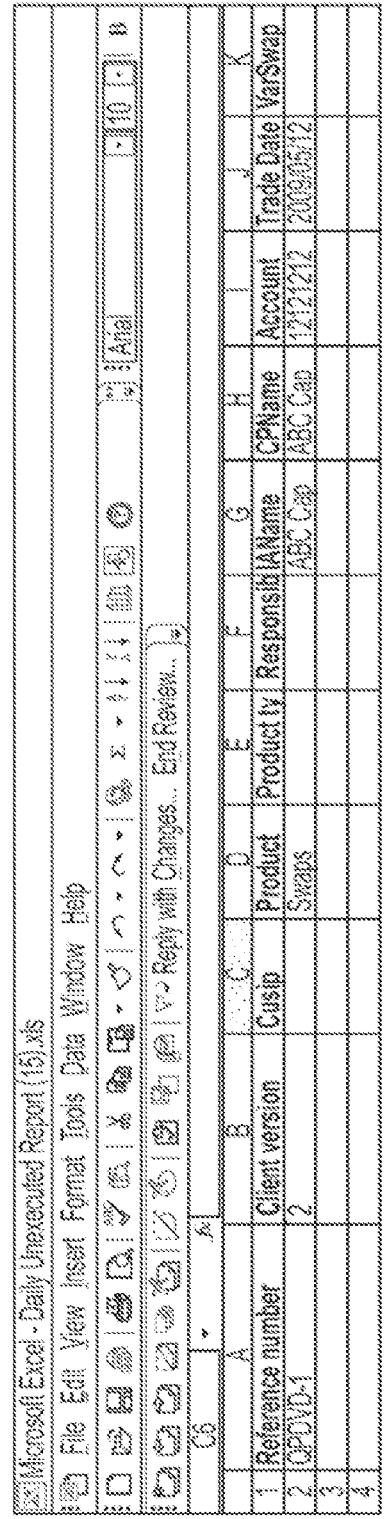
FIG. 8
FIG. 10

US 8,793,483 B2

COMPUTER-BASED, AUTOMATED WORKFLOW SYSTEM FOR SENDING SECURE REPORTS

PRIORITY CLAIM

The present application claims priority to U.S. provisional patent application Ser. No. 61/350,284, filed Jun. 1, 2010, entitled "Computer-based, Automated Workflow System for Sending Secure Reports," which is incorporated herein by reference in its entirety.

BACKGROUND

Companies often need to send reports to their customers or clients by e-mail or fax. The process for creating and distributing such reports often involves manual steps, which may lead to a security breach where, for example, a report is sent to an unintended recipient.

SUMMARY

In one general aspect, the present invention is directed to computer-based systems and methods for automating the workflow for generating and sending e-mails to external recipients in order to reduce security breaches in certain business reporting processes. As described further below, the system may utilize a backend server system that imports data eligible for a report attachment to be sent with the e-mail based on user-entered search criteria. The workflow logic of the backend server system prevents an e-mail with a confidential attachment report from being sent to the wrong counterparties. Additionally, the attachments may be strongly encrypted using an encryption program on the user's computer, and the password for the attachment preferably is unique to combination of counterparty and the role of the external recipient with respect to the attachment.

FIGURES

Various embodiments of the present invention are described herein in conjunction with the following figures, wherein:

FIGS. 2-7 are screen shots of example user interfaces provided by the computer-based automated workflow system according to various embodiments;

FIG. 8 illustrates an example of an e-mail sent using the computer-based automated workflow system according to various embodiments;

FIG. 9 illustrates an example password prompt for an e-mail sent using the computer-based automated workflow system according to various embodiments; and FIG. 10 illustrates an example of a report attached to the e-mail sent using the computer-based automated workflow system according to various embodiments.

DESCRIPTION

Embodiments of the present invention are directed to a computer-based automated workflow system for sending encrypted reports from a first party (sometimes referred to herein as a "user") associated with a first organization to an external recipient that is associated with a second organization (e.g., a counterparty) that is different from the first organization. In various embodiments, the report is an encrypted attachment to an e-mail that is sent to the external recipient. In the description below, the first organization is a financial services firm, and the reports concern unexecuted trade(s) of financial instruments (such as swaps, other types of derivatives, or other types of financial instruments), where the second organization (associated with the external recipient) is associated with the counterparty for the unexecuted trade(s) (e.g., the second organization is the actual counterparty or processes transactions on behalf of the counterparty), although it should be recognized that the invention is not so limited and that the system could be used to send other types of reports in different contexts in other embodiments.

Figure 1:
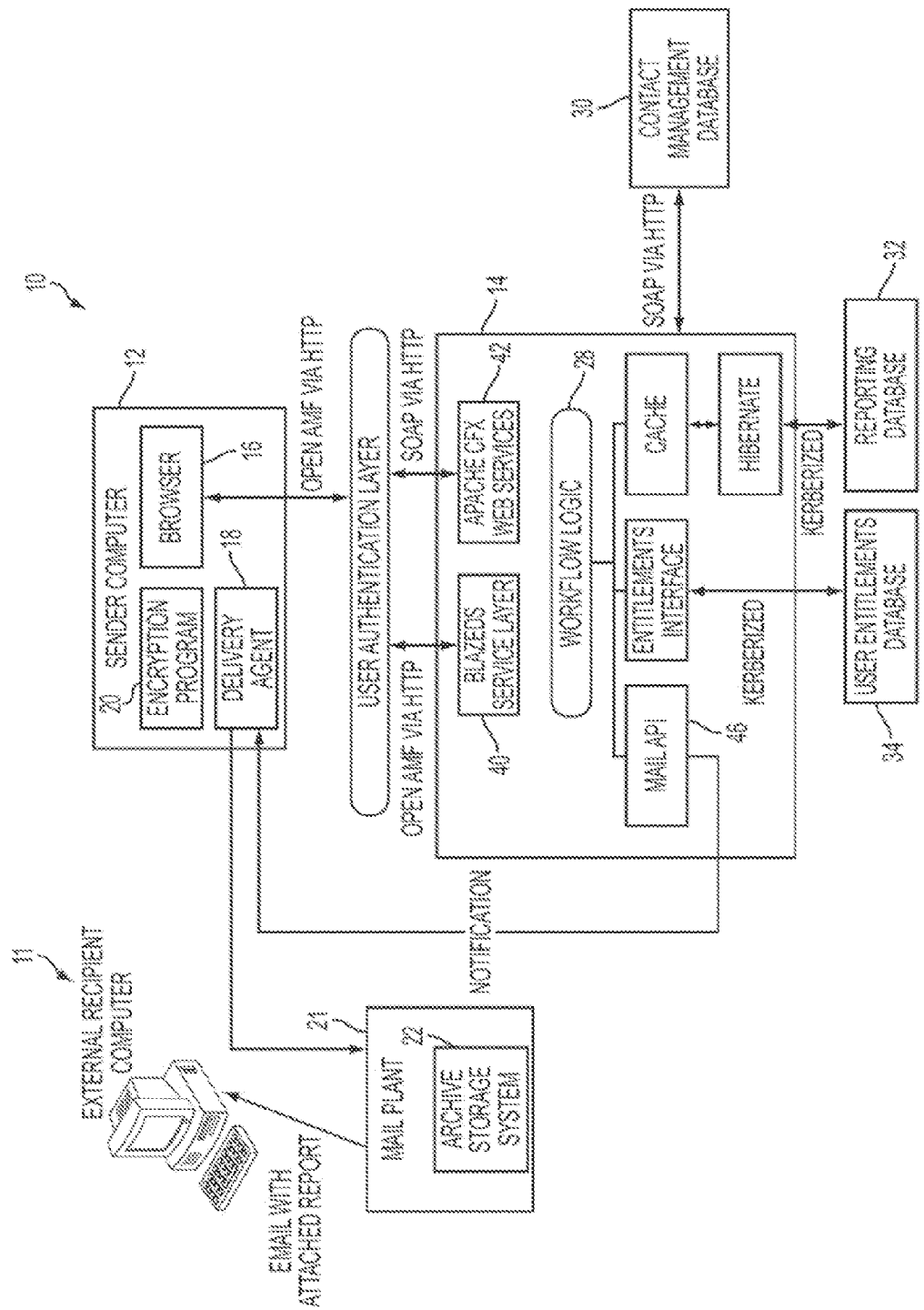
FIG. 1 is a diagram of a computer-based automated workflow system according to various embodiments.

In FIG. 1 is a diagram of the computer-based automated workflow system 10 according to various embodiments. The system 10 may comprise a user computer 12 in communication with a server system 14. The user computer 12 preferably is in communication with the server system 14 via a secure computer network, such as a LAN or WAN. The server system 14 may comprise one or a number of networked computer servers, such as a server farm. The server system 14, among other things, may access a number of computer database systems, described further below. The server system 14 may also provide a user interface (UI) for the user to prepare the reports for sending to one or more external recipient(s) 11 based on, among other things, trade data and data regarding the external recipient(s), such data being stored in database systems accessible by the server system 14. The user computer 12, the server system 14, and the database systems preferably are part of the same administrative domain, whereas the external recipient(s) 11 may be external to the first organization and part of an administrative domain that is different from the user computer 12 and server system 14.

The user computer 12 may execute a number of software programs, including but not limited to a browser 16, a delivery agent 18, and an encryption program 20. The user may access the user UI provided by the server system 14 using the browser 16, which may be an Adobe Flex-based client interface, executed within the browser 16 with an Adobe Flash plug-in. The UI, as explained further below, may allow the user to select data to generate the necessary reporting data to be included in the report sent to the external recipient(s). The delivery agent 18 may be thin client software program installed on the user desktop 12. In various embodiments, it is a stand-alone program (as opposed to a plug-in, e.g., a plug-in to an e-mail program of the user computer 12) written in C#, for example, that is downloaded to the user computer 12 from the server system 14. The delivery agent 18, as described in more detail below, may subscribe to notifications from the server system 14 pertaining to such e-mail requests. When such a subscribed-to notification is detected or received by the delivery agent 18, the delivery agent 18 may download and encrypt the report using encryption provided by the encryption program 20. The report may be encrypted with the password for the external recipient(s), which password may be stored in one of the database systems of the server system 14, as described further below.

Once the report is encrypted, the delivery agent 18 may initiate sending of the e-mail (with the encrypted report as an attachment) to the external recipient 11. The delivery agent 18 may communicate with a mail plant 21 of the first organization to send the e-mail to the external recipient 11. The mail plant 21 may be implemented as one or more servers (including one or more email servers) that handle the e-mail protocol for the first organization. In various embodiments, the report may be a spreadsheet file, such as a Microsoft Excel spreadsheet file, although the invention is not so limited and could be used with other types of files (e.g., word processing files, pdf files, image files, etc.) The encryption program 20 may provide very strong encryption for the reports. For embodiments where the report is a Microsoft Excel spreadsheet file, the encryption program 20 may utilize Microsoft Office Excel SDK with the RC4 Microsoft Strong Cryptographic Provider encryption option (RC4 with 128-bit keys). Such an encryption option may be stronger than encryption options available through the JAVA platform of the server system 14. The mail plant may also store the e-mail in an internal e-mail archive system 22 of the first organization. The internal e-mail archive system 22 may store the e-mail and the report unencrypted. More details about storing unencrypted e-mails in an archival system are described in U.S. patent application Pub. No. 2007/0106904 A1, which is incorporated herein by reference in its entirety.

The server system 14 may provide the UI for the user and may execute the workflow logic 28 for controlling preparation and dissemination of the reports. The workflow logic 28 may prevent a report from being sent in an e-mail to recipients at different organizations (e.g., two or more organizations each associated with a different trading name). Also, preferably the passwords for the encrypted attachments are linked to combinations of counterparty and role for the recipients. For example, all recipients at a particular counterparty (e.g., Counterparty X) having Role A will have one password, and all recipients at Counterparty X having Role B will have a different password, etc. As such, if there are two or more people at Counterparty X that have the same role, their password to decrypt the report will be the same. Also, recipients at a different organization (e.g., Counterparty Y) having Role A may have a different password than the Role A recipients at Counterparty X (although as explained above, the workflow logic 28 preferably prevents an e-mail from being sent to two (or more) different counterparties). The contact management database 30, therefore, may store data regarding the possible counterparties (e.g., trading names) to which reports are to be sent. Each counterparty may have associated with it one or more contacts that are stored in the database 30. The contact management database 30 may store the information for the contacts, including their role with respect to the reports for the counterparty. The passwords for the reports, which are unique to the combination of counterparty and role of the recipient, may also be stored in the contact management database 30.

The server system 14 may interface with a number of computer database systems for producing the reports, including but not limited to a contact management database system 30, a reporting database 32, and a user entitlements database 34. The contact management database system 30 may store contact data for potential external recipients of the reports, including: their contact information (e.g., e-mail address), their organization (e.g., trading names), their role with respect to the subject matter of the reports (e.g., operations, etc.), and their password (which preferably is linked to their role, as explained above). The reporting database 32 may store data for the reports, e.g., data regarding the unexecuted trades. The server system 14 may retrieve the required data for the report to be sent to the external recipients based on the search criteria input by the user (at the user computer 12) via the UI. The user entitlements database 34 may store data regarding entitlements of internal users of the system 10 (such as entitlement data for the user of user computer 12) to control the user's access to and entitlements with respect to the reporting service of the system 10. More details regarding such a user entitlements database may be found in U.S. patent application Pub. No. 2007/0250508 A1, which is incorporated herein by reference.

The server system 14 may utilize an open source application framework for a JAVA platform, such as Java Spring, and may utilize an open source servlet container, such as Apache Tomcat. The servlet container may comprise a server-based Java remoting and web messaging service layer, such as a BlazeDS service layer 40, that allows connection to back-end distributed data (e.g., database systems 30, 32, 34) and the pushing of data in real-time to the user computer 12 (e.g., via Adobe Flash/Flex). The servlet container may also comprise an open-source Web Services API, such as an Apache CXF Web services API 42. Both the BlazeDS service layer 40 and the Apache CXF Web services API 42 may communicate with a user authentication layer 44, which authenticates the user (at user computer 12). The server system 14 may connect to the contact management database system 30 to retrieve the relevant contact information via HTTP SOAP services or via TCP, for example.

The servlet container may also comprise a mail API, such as a Javamail API 46, which may send the e-mail with the relevant attachment, and with valid contacts for the external recipient(s) 11, to the user computer 12 for sending to the external recipient(s) 11. The delivery agent 18 of the user computer 12 subscribes to a publication-subscription service with respect to the mail API 46. When the server system 14 generates the report, the delivery agent 18 receives a notification via the publication-subscription service and downloads the report along with the applicable client contact data from the mail API 46. The report is then encrypted using the encryption program 20. The user computer 12 (e.g., executing the delivery agent 18) then sends the e-mail, with the encrypted report attachment, to the external recipient(s) 11 via the mail plant 21. In addition, as mentioned above, a non-encrypted archival version of the e-mail and report are stored by the computer-based archival system 22 for archiving.

Figure 2:
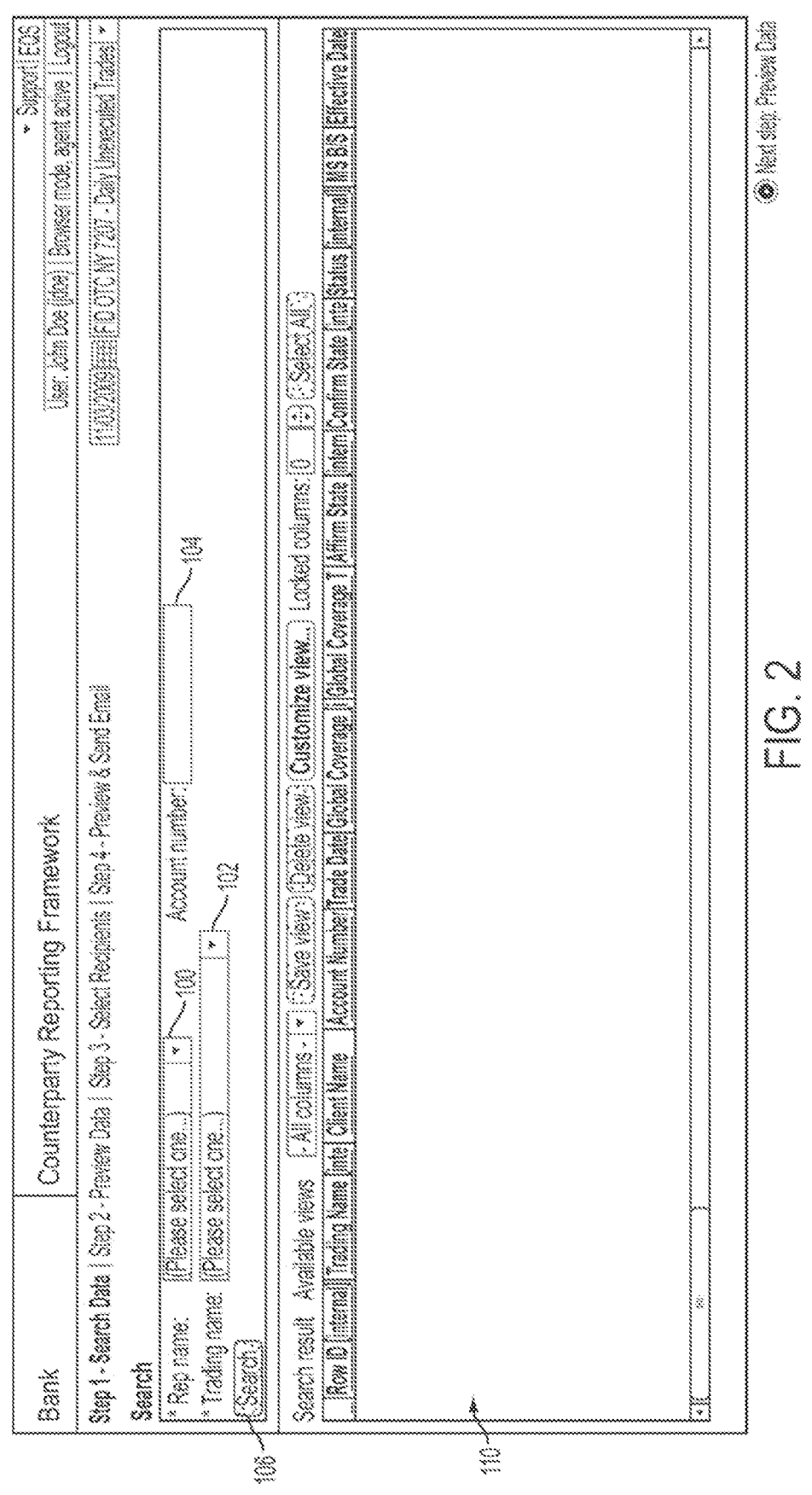

FIGS. 2-7 show example screen shots of the user interface (UI) for specifying the reports to be sent and the recipients. The first party may access the UI with the first party's browser by accessing a URL for the server system 14. FIG. 2 shows an initial UI that the first party may access for the process, titled "Step 1—Search Data." The UI for Step 1 may have several search fields through which the first party can search for the reports to be sent. The search fields may comprise a representative name search field 100, a trading name search field 102, and an account number search field 104. The user may select search criteria from a drop-down menu for each of these search field and/or type search criteria in the search fields. In the illustrated embodiment, the representative name search field 100 may allow the user to specify a person's name that is responsible for fulfilling a role in connection with the subject matter of the reports. Continuing, for example, with the example of the reports pertaining to unexecuted trades of financial instruments, the representative name search field 100 may allow the user to specify a person's names that is responsible within the first organization for performing a role with respect to the unexecuted trades, such as processing them or some other role. Data regarding the persons within the first organization responsible for performing various roles with respect to the subject matter of the reports (e.g., unexecuted trades) may be stored in an account maintenance database (not shown). The server system 14 may access this database to populate the drop-down selections for the representative name search field 100 or to search for matches in response to search criteria entered by the user in the representative name search field 100.

The trading name search field 102 may allow the user to specify third parties, such as the first organization's counterparties for such trades (or third parties processing the trades for the counterparties). The account numbers for a trading name may correspond to different funds associated with the trading name and each account number preferably is unique. For example, therefore, each unique account number may be associated with a single trading name, but a single trading name may be associated with several unique account numbers, such as if the trading name has several different associated accounts or funds. Data regarding the trades may be stored in the reporting database 32 and contact data for the counterparties and account numbers may be stored in the contact management database system 30. The contact management database system 30 preferably has contact information associated with each account number.

In the illustrated embodiments, when the user activates the search button 106, the server system 14 searches the relevant databases (e.g., the reporting database 32) to find the unexecuted trades that match the search criteria. Data regarding the unexecuted trades are displayed in the search results field 110. In various embodiments, the user must enter search criteria for at least one of these fields, but the user could also specify search criteria for two or more of the search fields. For example, the user could search for all unexecuted trades covered internally by John Doe, or the user could search for all unexecuted trades involving Counterparty 1 (or a legal entity related to Counterparty 1), or the user could search for all unexecuted trades involving Counterparty 1 (or a legal entity related to Counterparty 1) that are covered internally by John Doe.

Figure 3:
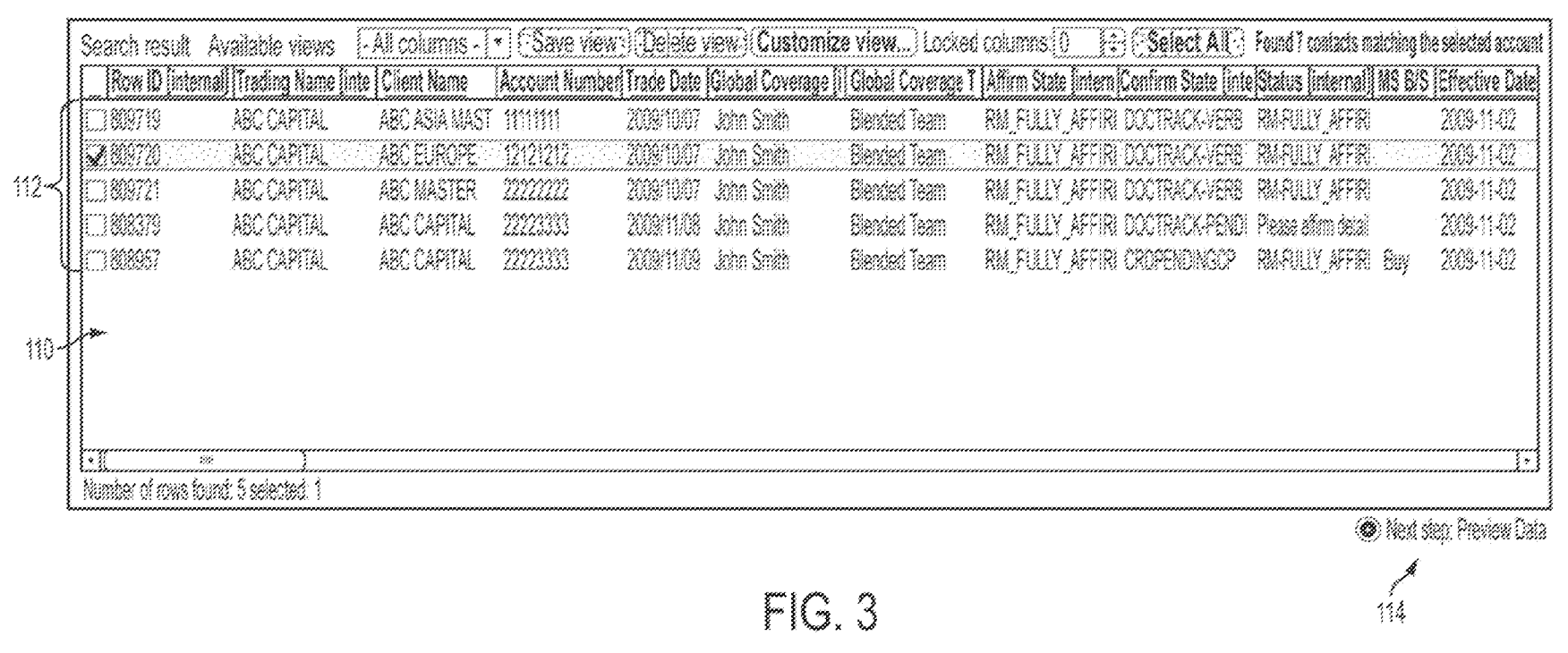

FIG. 3 shows example search results. Data for each unexecuted trade matching the search criteria may displayed on a separate line of the search results field 110. The data may comprise, for example, the counterparty name (trading name), the account number, the trade date, the person and teams within the first organization that are responsible for covering the trade, the effective data of the trade, and/or any other relevant data. Each trade displayed in the search results field 110 may have an associated check box 112. The user can check the check boxes 112 for the unexecuted trades to be included in the report to be sent. Of course, in other embodiments, different user control options besides check boxes may be used to allow the user to indicate the unexecuted trades to be included in the report. To proceed to the next step, the user may select the "Next Step: Preview Data" button 114 or similar user control.

In various embodiments, the workflow logic 28 of the server system 12 will prevent the user from proceeding to Step 2—Preview Data if the selected trades at Step 1 are associated with more than one trading name. That is, for example, the workflow logic 28 will only proceed to Step 2—Preview Data if the user has selected trades associated with a single, common trading name. If the user selects trades associated with more than one trading name, an error message may be provided to the user so that the user can take corrective action. In addition, in various embodiments, if one of the trades shown in data field 124 (see FIG. 3) has no valid contacts associated with the trading name, the workflow logic 28 will prevent the user from selecting that trade. If the user selects a trade with no valid associated contacts, an error message may be provided to the user so that the user can take corrective action. These preventive measures implemented by the workflow logic 28 reduce the possibility of sending the reports to unintended recipients.

Figure 4:
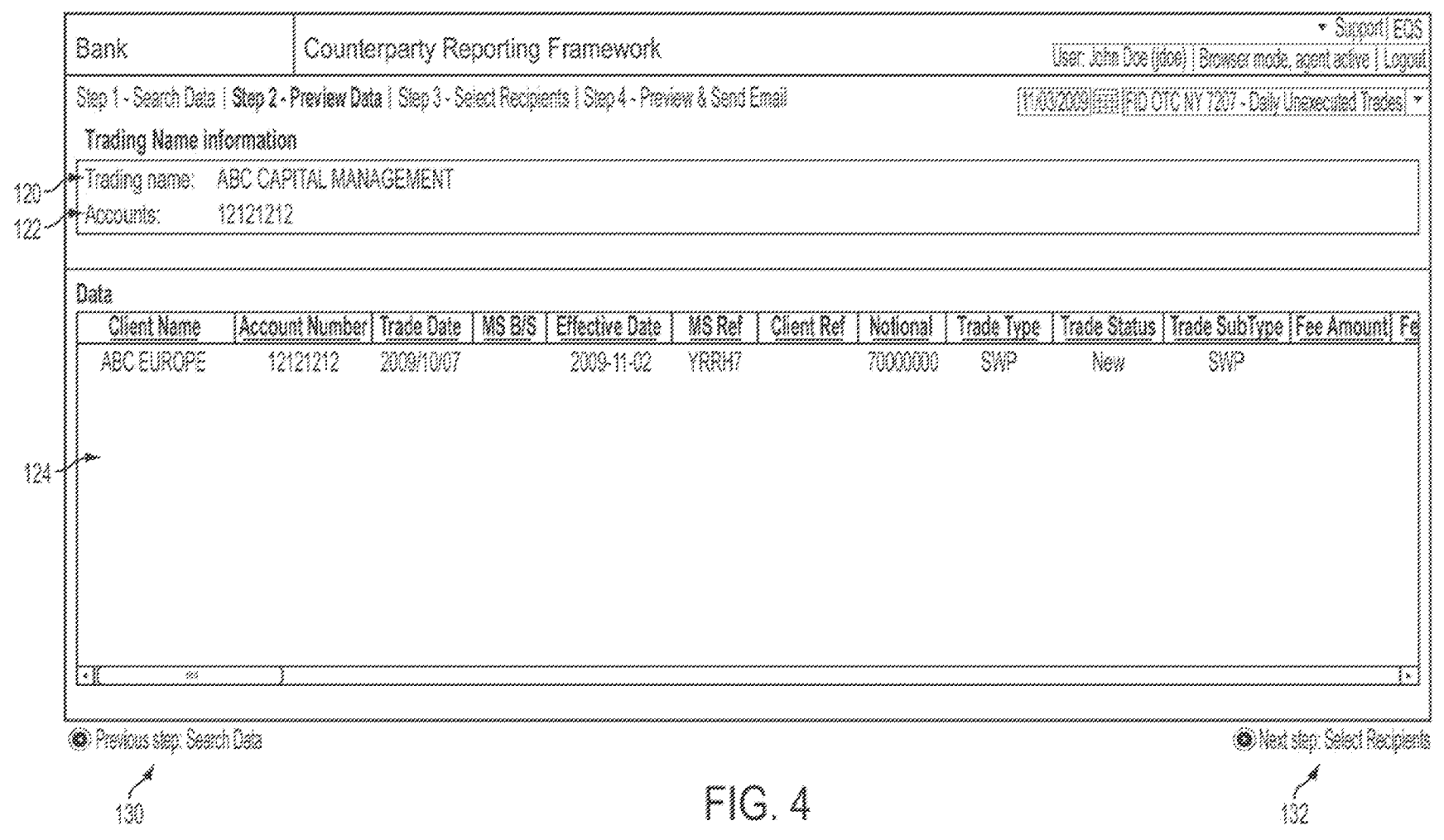

Assuming the user successfully completes Step 1 and selects the "Next Step: Preview Data" button 114, the UI advances to Step 2—Preview Data, where the user can review the data to be sent in the report, as shown in the example of FIG. 4. The Preview Data UI may include, as shown in FIG. 4, a trading name field 120 that indicates the trading name associated with the selected trades, and an account number field 122 that indicates the account number for the account of the trading name associated with the selected trades. The data for the selected trades that are to be included in the report may be shown in data field 124. In the illustrated example, only one trade was selected (see FIG. 3), so only one trade is shown in data field 124 of FIG. 4.

From the Step 2—Preview Data UI shown in FIG. 4, if the user wishes to revise the selected trades for the report, the user may select the "Previous step: Search Data" button 130, which, when selected, returns the user to the "Step 1—Search Data" UI shown in FIG. 2. If, on the other hand, the user is satisfied with the data for the report, from the Step 2—Preview Data UI shown in FIG. 4, the user may select the "Next Step: Select Recipients" button 132 to advance to the next step—selecting recipients for the report.

Figure 5:
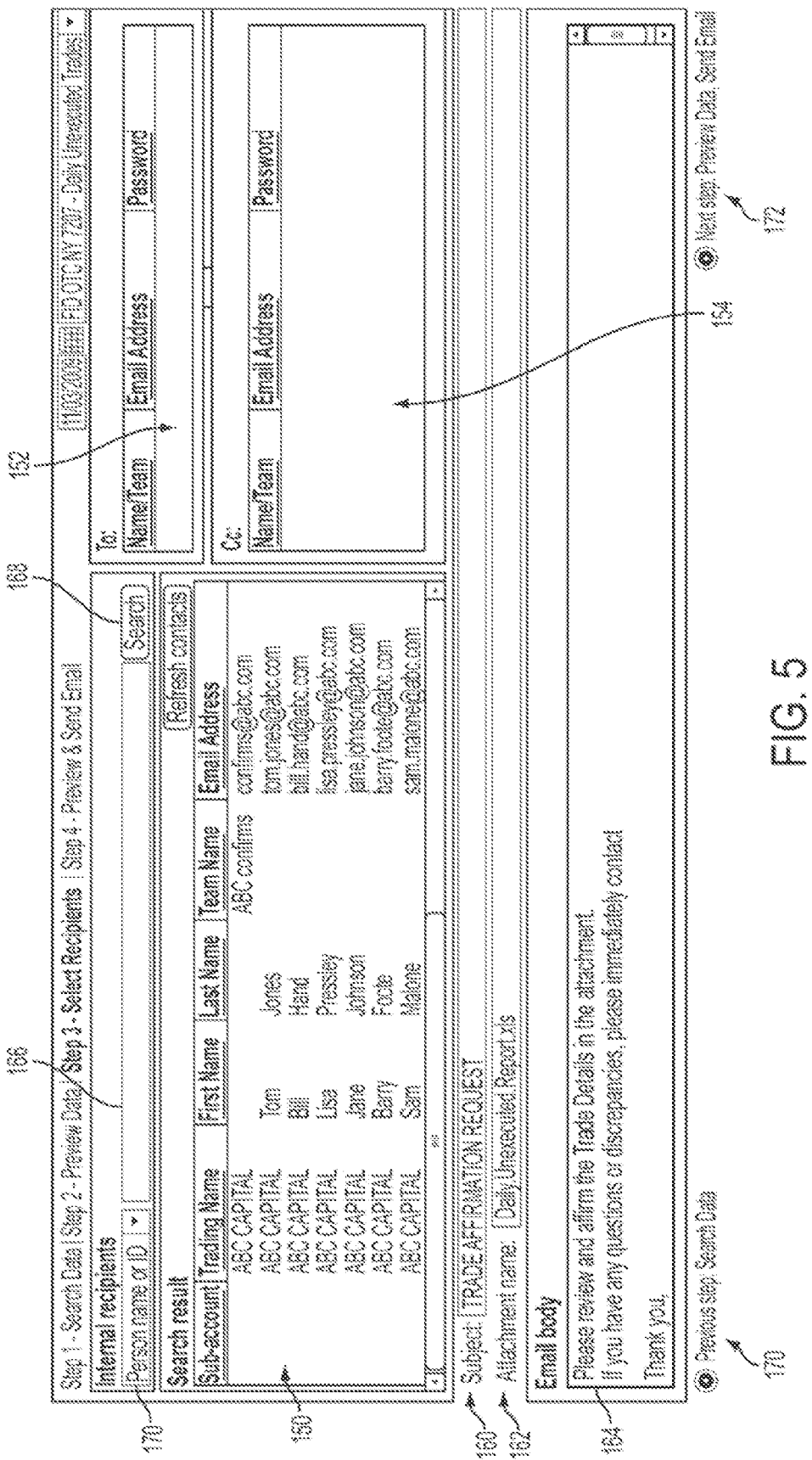

FIG. 5 is an example of the "Step 3—Select Recipients" UI. Using this UI, the user may select the external recipients for the report. Available external recipient contacts for the selected trades may be displayed in the contacts field 150. In various embodiments, the user could select an external recipient contact for the report by dragging the contact from the contacts field 150 to the "To" field 152 (for primary recipients) or to the "Cc" field 154 (for secondary recipients). In other embodiments, different mechanisms for selecting the "To" and "Cc" recipients may be used, such as check boxes, radio buttons, etc. The set of potential external recipients in contacts field 150 may be based on data retrieved by the server system 14 from the contact management database system 30. The set of potential external recipients in contacts field 150 may be controlled, in various embodiments, based on the trading name and account number.

The user may enter text for the subject field of the e-mail at subject line field 160. The name of the attachment/report of the e-mail may be displayed at attachment field 162. The report may be generated by the server system 14 based on the trades selected by the user. As mentioned previously, the report may be a spreadsheet file, such as a Microsoft Excel spreadsheet file, although in other embodiments the attachment/report may be a different type of file, such word processing files, pdf files, image files, etc. At e-mail body field 164, the user may enter text for the body of the e-mail to be sent along with the report to the external recipient(s) 11. The user may also specify internal recipients (e.g., recipients internal to the first organization) for the e-mail. For example, at field 166 the user may enter text (e.g., name or ID) to search for possible internal recipients of the e-mail. Activating the search button 168 may cause the server system 14 to search for internal recipients from a relevant database. A listing of available internal recipients may then display, in a popup for example, for the user. An example of such a popup display in shown in FIG. 6. From this popup, the user could select the desired internal recipient and click the "OK" button 174 to add the selected internal recipient(s) to the e-mail. In various embodiments, the system 10 also cc's the user on the sent e-mail so that there is no need for the user to add him/herself as a cc to the e-mail.

From the Step 3—Select Recipients UI shown in FIG. 5, if the user wishes to revise the selected trades for the report, the user may select the "Previous step: Search Data" button 170, which, when selected, returns the user to the "Step 1—Search Data" UI shown in FIG. 2. If, on the other hand, the user is satisfied with the data for the report and the selected recipients, from the Step 3—Select Recipients UI shown in FIG. 5, the user may select the "Next Step: Preview Data, Send Email" button 172 to advance to the next step—previewing and sending the e-mail.

Figure 7:
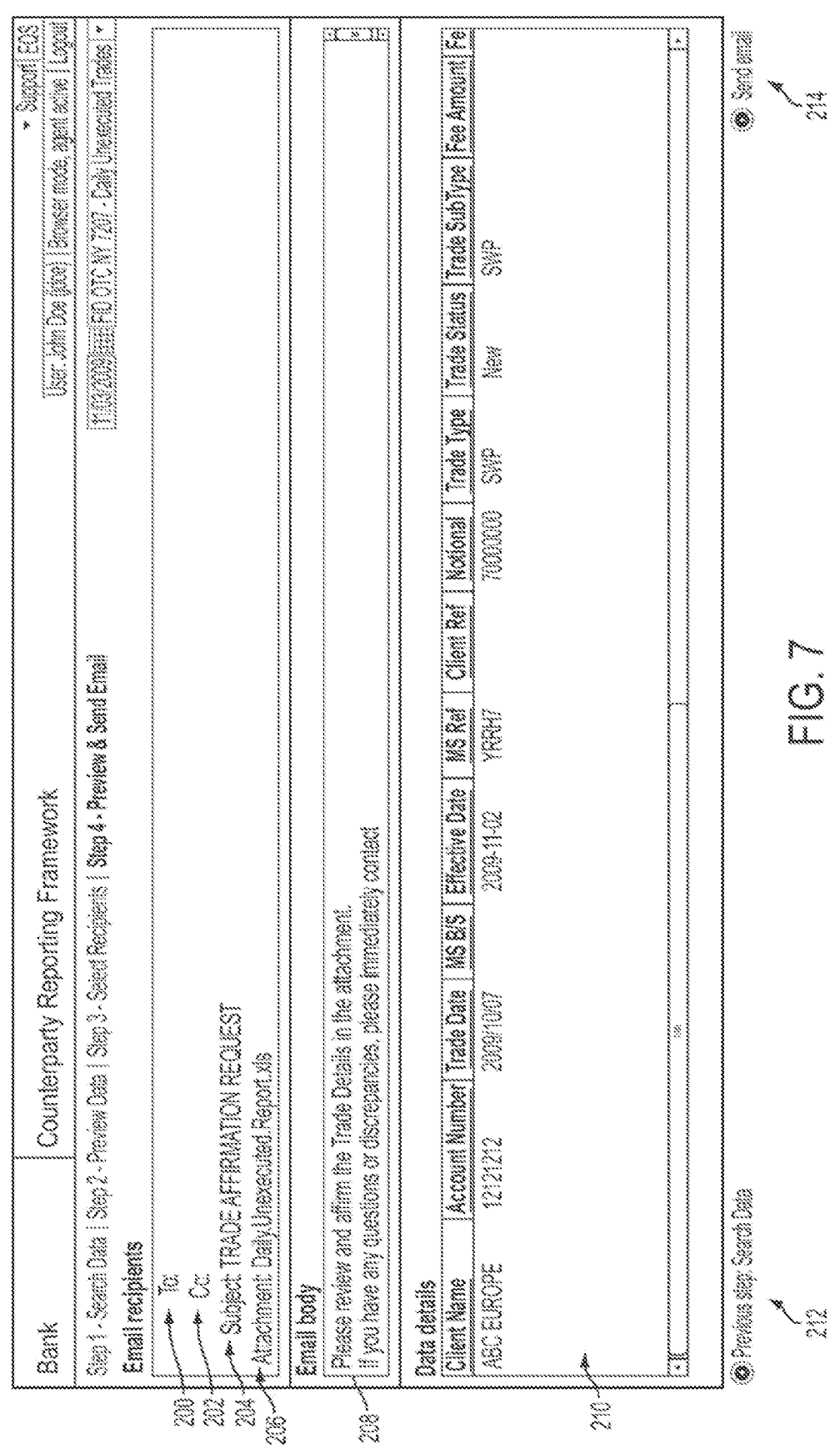

FIG. 7 illustrates an example for the "Step 4—Preview and Send E-mail" UI. This UI previews the e-mail to be sent to the external and internal recipients. The direct recipients of the e-mail may be shown at the To line 200, and the secondary recipients may be shown at the "Cc" line 202. The subject description for the e-mail that the user entered at field 160 of the "Step 3—Select Recipients" UI (see FIG. 5) is shown in the subject line field 204. The name of the file for the attachment/report is shown in the attachment field 206. The text of the body of the e-mail that the user entered at field 164 of the "Step 3—Select Recipients" UI (see FIG. 5) is shown in the e-mail body field 208. The data to be included in the attached report is shown in the data details field 210.

If the user wishes to revise the selected trades for the report, the user may select the "Previous step: Search Data" button 212, which, when selected, returns the user to the "Step 1—Search Data" UI shown in FIG. 2. If, on the other hand, the user is satisfied with the e-mail (including the data for the report to be attached), the user may select the "Send e-mail" button 214. Upon selection of the "Send e-mail" button 214, the server system 14 may generate the file for the report (e.g., a Microsoft Excel spreadsheet file). Also, the Mail API 46 may publish a notification to the delivery agent 18 of the user computer 12 indicating that a report is ready for sending. Upon receipt of the notification, the delivery agent 18 may download the report from the server system 14 and use the encryption program 20 to encrypt the report. Then, the user computer 12 may initiate sending of the e-mail (with the attached report) to the external and internal recipients via the first organization's mail plant 21. Also, as mentioned previously, an unencrypted version of the e-mail (and report) may be stored in the archival storage system 22 for archiving.

FIG. 8 shows an example of the e-mail that is sent to the internal recipient(s) 11. FIG. 9 shows the password prompt that may be presented to the recipient of the e-mail when the recipient attempts to open the e-mail attachment. FIG. 10 is an example of the attachment file, in this case a Microsoft Excel spreadsheet.

The examples presented herein are intended to illustrate potential and specific implementations of the embodiments. It can be appreciated that the examples are intended primarily for purposes of illustration for those skilled in the art. No particular aspect or aspects of the examples is/are intended to limit the scope of the described embodiments. The figures and descriptions of the embodiments have been simplified to illustrate elements that are relevant for a clear understanding of the embodiments, while eliminating, for purposes of clarity, other elements.

In general, it will be apparent to one of ordinary skill in the art that at least some of the embodiments described herein may be implemented in many different embodiments of software, firmware, and/or hardware. The software and firmware code may be executed by a processor or any other similar computing device. The software code or specialized control hardware that may be used to implement embodiments is not limiting. For example, embodiments described herein may be implemented in computer software using any suitable computer software language type, using, for example, conventional or object-oriented techniques. Such software may be stored on any type of suitable computer-readable medium or media, such as, for example, solid state memory (e.g., RAM or ROM), magnetic storage media, or optical storage media. The operation and behavior of the embodiments may be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes associated with the present embodiments may be executed by programmable equipment, such as computers, computer systems, servers, server systems, database systems, and/or processors. Software that may cause programmable equipment to execute processes may be stored in any storage device, such as, for example, a computer system (nonvolatile) memory, an optical disk, magnetic tape, or magnetic disk. Furthermore, at least some of the processes may be programmed when the computer system is manufactured or stored on various types of computer-readable media.

It can also be appreciated that certain process aspects described herein may be performed using instructions stored on a computer-readable medium or media that direct a computer system to perform the process steps. A computer-readable medium may include, for example, memory devices such as memory chips (RAM or ROM), diskettes, compact discs (CDs), digital versatile discs (DVDs), optical disk drives, or hard disk drives. A computer-readable medium may also include memory storage that is physical, virtual, permanent, temporary, semi-permanent, and/or semi-temporary.

A "computer," "computer system," "server," or "server system" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component to perform a given function or functions. Except where such substitution would not be operative, such substitution is within the intended scope of the embodiments. Any servers described herein, for example, may be replaced by a "server farm" or other grouping of networked servers (such as server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand and/or providing backup contingency in the event of component failure or reduction in operability.

The computer system may comprise one or more processors in communication with memory (e.g., RAM or ROM) via data bus. The data bus may carry electrical signals between the processor(s) and the memory. The processor and the memory may comprise electrical circuits that conduct electrical current. Charge states of various components of the circuits, such as solid state transistors of the processor(s) and/or memory circuit(s), may change during operation of the circuits.

According to various embodiments, the present invention is directed to a computer-based automated workflow system for sending an e-mail with an attached report to one or more external recipients. The workflow system may comprise a second computer system 12 and a back-end computer system comprising a report preparation computer system (e.g., server system 14) and mail plant computer system 21, all associated with a first organization and part of a first administrative domain. The sender computer system may comprise at least one processor and a plurality of software programs that are executable by the at least one processor. The plurality of software programs may comprise a delivery agent program and an encryption program. The report preparation computer system may comprise at least one computer, and may be programmed to generate a report to be sent to the one or more external recipients, which are each associated with a second administrative domain. The report preparation computer system generates the report based on at least, (i) data stored in one or more databases that are in communication with the report preparation computer system, and (ii) one or more criteria input from the sender computer system. The report preparation computer system is programmed to send a notification to the sender computer system when the report is generated. The delivery agent program of the sender computer system causes the sender computer system to download from the report preparation computer system upon receipt of the notification from the report preparation computer system (i) the report and (ii) valid contact information for the one or more external recipients. The sender computer system further comprises an encryption program that causes the computer system to encrypt the report downloaded from the report preparation computer system to thereby generate an encrypted report. The encrypted report is attached to the e-mail that is sent to the one or more external recipients. The sender computer system is configured to send the encrypted report to the e-mail computer system, which sends the encrypted report as an attachment to an e-mail sent to the one or more external recipients.

According to various implementations, the report preparation computer system is programmed to, among other things: (i) receive from the sender computer system at least one search criterion for the report; (ii) identify a plurality of reports based on the at least one search criterion; (iii) receive, from the sender computer system, an indication of at least one report from the plurality of reports to be sent to the one or more external users; (iv) receive, from the sender computer system, an indication of the one or more external users; (v) receive, from the user an e-mail text; and (vi) upon receiving the e-mail text, send the notification to the sender computer system. The valid contact information may prevent the e-mail from being sent to external recipients at different organizations. Encrypting the report may further comprise encrypting the report with a password, where the password is unique to a combination of the second organization and a role of the one or more external recipients at the second organization with respect to a subject matter of the report. The delivery agent program may subscribe to notifications from the report preparation computer system regarding generation of reports. The reports may pertain to unexecuted trades between the first organization and a second organization, which is associated with the external recipients. In addition, the report and an unencrypted version of the e-ail may be stored at an archival storage system associated with the e-mail computer system.

According to other various embodiments, the present invention is directed to a computer-based method for sending an e-mail with an attached report to one or more external recipients. The method may comprise generating, by a first computer system, a report to be sent to the one or more external recipients based on, at least (i) data stored in one or more databases that are in communication with the first computer system, and (ii) one or more criteria input to the computer system by a sender computer system, wherein the first computer system comprises at least one processor and operatively associated memory. The method may also comprise the step of sending, by the first computer system a notification to the sender computer system when the report is generated, wherein the sender computer system comprises at least one processor and operatively associated memory. The method may also comprise the step of downloading, by the sender computer system, upon receipt of the notification from the first computer system, at least (i) the report and (ii) valid contact information for the one or more external recipients encrypting, by the sender computer system, the report to thereby generate an encrypted report. The method may also comprise the step of sending, by the sender computer system, the encrypted report as an attachment to an e-mail to the one or more external recipients, wherein the first computer system and the sender computer system are associated with a first administrative domain, and the one or more external recipients are associated with a second administrative domain.

While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A computer-based automated workflow system for sending an e-mail with an attached report from a first organization to one or more external recipients associated with a second organization, the system comprising:
   a sender computer system, associated with the first organization, that comprises at least one processor and a plurality of software programs that are executable by the at least one processor, wherein the plurality of software programs comprise a delivery agent program and an encryption program;
   an e-mail computer system associated with the first organization, wherein the e-mail computer system comprises at least one e-mail server;
   a report preparation computer system that is associated with the first organization and that is in communication with the sender computer system and the e-mail computer system, wherein the report preparation computer system comprises:

at least one computer;
a first database in communication with the at least one computer that stores data related to a subject matter for the report; and
a second database in communication with the at least one computer that stores role data related to the one or more external recipients, the role data including data roles of the one or more external recipient at the second organization,
wherein the report preparation computer system, the sender computer system and the e-mail computer system are each associated with a first administrative domain of the first organization, and wherein the report preparation computer system is for generating a report to be sent to the one or more external recipients, wherein the one or more external recipients are each associated with a second administrative domain for the second organization, wherein the report preparation computer system generates the report based on at least, (i) data stored in the first database, and (ii) one or more criteria input from the sender computer system, and wherein the report preparation computer system is programmed to send a notification to the sender computer system when the report is generated;
wherein the delivery agent program of the sender computer system causes the sender computer system to download from the report preparation computer system upon receipt of the notification from the report preparation computer system (i) the report and (ii) valid contact information for the one or more external recipients, wherein a user of the sender computer system selects the one or more external recipients from a set of potential external recipients that is determined by the report preparation computer system based on at least the data in the report, and wherein the valid contact information for the one or more external recipients is determined by the report preparation computer system based on at least the data in the report such that the valid contact information prevents the e-mail from being sent (a) to an external recipient outside of the first or second organizations and (b) an external recipient whose role is not entitled to the data in the report based on the role data stored in the second database;
wherein the encryption program of the sender computer system causes the sender computer system to encrypt the report downloaded from the report preparation computer system to thereby generate an encrypted report, wherein the report is encrypted with a password that is unique to a combination of the second organization and a role of the one or more external recipients at the second organization with respect to a subject matter of the report, wherein the encrypted report is attached to the e-mail that is sent to the one or more external recipients;
wherein the sender computer system is configured to send the encrypted report to the e-mail computer system; and
wherein the e-mail computer system sends the encrypted report as an attachment to an e-mail sent by the e-mail computer system to the one or more external recipients.

2. The computer-based automated workflow system of claim 1, wherein the report preparation computer system is programmed to:
receive from the sender computer system at least one search criterion for the report;
identify a plurality of reports based on the at least one search criterion;
receive, from the sender computer system, an indication of at least one report from the plurality of reports to be sent to the one or more external recipients;
receive, from the sender computer system, an indication of the one or more external recipients;
receive, from the user an e-mail text; and
upon receiving the e-mail text, send the notification to the sender computer system.

3. The computer-based automated workflow system of claim 1, wherein the delivery agent program subscribes to notifications from the report preparation computer system regarding generation of reports.

4. The computer-based automated workflow system of claim 1, wherein the report comprises data describing at least one unexecuted trade associated with the first organization and the second organization.

5. The computer-based automated workflow system of claim 1, wherein sending the report to the e-mail computer system comprises sending the report and the encrypted report, wherein the encrypted report is attached to the e-mail that is sent to the one or more external recipients and wherein the report and an unencrypted version of the e-mail are stored at an archival storage system associated with the e-mail computer system.

6. A computer-based method for sending an e-mail with an attached report from a first organization to one or more external recipients associated with a second organization, the method comprising:
storing in a first database data related to a subject matter of the report;
storing in a second database role data related to the one or more external recipients, the role data including data roles of the one or more external recipient at the second organization:
generating, by a first computer system, a report to be sent to the one or more external recipients based on, at least (i) data stored in the first database, and (ii) one or more criteria input to the first computer system by a sender computer system, wherein the first computer system comprises at least one processor and operatively associated memory;
sending, by the first computer system a notification to the sender computer system when the report is generated, wherein the sender computer system comprises at least one processor and operatively associated memory;
determining, by the first computer system valid contact information for a set of potential external recipients based on at least the data in the report such that the valid contact information prevents the e-mail from being sent (a) to an external recipient outside of the first or second organizations and (b) an external recipient whose role is not entitled to the data in the report based on the role data stored in the second database, wherein a user of the sender computer system selects the one or more external recipients from the set of potential external recipients that is determined by the first computer system;
downloading, by the sender computer system, upon receipt of the notification from the first computer system, at least (i) the report and (ii) the valid contact information for the one or more external recipients;
encrypting, by the sender computer system, the report to thereby generate an encrypted report, wherein the report is encrypted with a password that is unique to a combination of the second organization and a role of the one or more external recipients at the second organization with respect to a subject matter of the report; and sending, by the sender computer system, the encrypted report as an attachment to an e-mail to the one or more external recipients, wherein the first computer system and the sender computer system are associated with a first administrative domain, and the one or more external recipients are associated with a second administrative domain.

7. The computer-based method of claim 6, wherein the first computer system comprises an e-mail computer system and a report preparation computer system, wherein the e-mail computer system comprises at least one e-mail server, and wherein sending the encrypted report to the one or more external recipients comprises forwarding, by the at least one e-mail server, the email from the sender computer system to the one or more external recipients; and generating the report comprises generating the report by the report preparation computer system; and sending the notification to the sender computer system comprises sending the notification of generating of the report from the report preparation computer system to the sender computer system.

8. The computer-based method of claim 7, wherein the sender computer system is configured to execute a delivery agent program and an encryption program:

wherein the delivery agent program of the sender computer system causes the sender computer system to download the report from the report preparation computer system upon receipt of the notification from the report preparation computer system; and wherein the encryption program causes the sender computer system to encrypt the report downloaded from the report preparation computer system to thereby generate the encrypted report.

9. The computer-based method of claim 7, further comprising:

determining, by the first computer system, whether the second organization is associated with the report; and upon a determination that the second organization is associated with the report, determining the valid contact information for the one or more external recipient at the second organization, such that if the second organization does not have at least one valid contact, sending of the e-mail with the report is prevented.

10. The computer-based method of claim 7, wherein the sender computer system subscribes to notifications from the first computer system regarding generation of reports.

11. The computer-based method of claim 7, wherein the encrypted report is attached to the e-mail that is sent to the one or more external recipients and wherein the report and an unencrypted version of the e-mail are stored at an archival storage system associated with the first computer system.

12. The computer-based method of claim 7, wherein the report comprises data describing at least one unexecuted trade associated with the first organization and the second organization.

13. The computer-based method of claim 7, further comprising:

receiving by the first computer system at least one search criterion for the report from the sender computer system;

identifying by the first computer system a plurality of reports based on the at least one search criterion;

receiving, by the first computer system from the sender computer system, an indication of at least one report from the plurality of reports to be sent to the one or more external recipients;

receiving, by the first computer system from the sender computer system, an indication of the one or more external recipients;

receiving, by the first computer system from the sender computer system, e-mail text; and upon receiving the e-mail text, sending, by the first computer system from the sender computer system, the notification to the sender computer system.

* * * * *